United States Patent Office 3,540,099
Patented Nov. 17, 1970

3,540,099
MACHINE FOR MAKING ELECTRIC CONDENSERS
Jacques Perrenoud, Fribourg, Switzerland, assignor to Condensateurs Fribourg S.A., Fribourg, Switzerland, a Swiss company
Filed Jan. 29, 1968, Ser. No. 701,231
Claims priority, application Switzerland, Jan. 27, 1967, 1,283/67
Int. Cl. H01g *13/00*
U.S. Cl. 29—25.42                    3 Claims

ABSTRACT OF THE DISCLOSURE

A machine is disclosed for winding electric condensers from conductive and nonconductive strips of material onto a permanent core member. A core gripping mechanism is selectively moved through different working positions to effect winding of the condenser, cutting of the strips, and gluing of a protective band around the wound condenser. A core supply chamber is disposed adjacent the core gripping mechanism and a fluid-operated motor individually feeds core members from the core supply chamber to the core gripping mechanism.

---

The present invention relates to an apparatus for winding condensers and more particularly to an apparatus employing core members which are permanently retained in the wound condenser.

Electric condensers composed of alternate layers of metallized insulating strips or of conductive and non conductive wires are generally wound on a spindle or mandrel which, after winding, is removed from the wound piece. This prior art technique has the disadvantage of leaving a hollow portion in the center of the wound condenser after withdrawal of the mandrel and often results in crushing of the winding or a deterioration of the center of the coil upon withdrawal of the mandrel. Also, it is generally necessary to fill this hollow for subsequent steps in manufacturing the condenser. It has already been proposed to wind condensers on an insulating core which remains permanently in the condenser. This technique is advantageous in that it makes possible the standardization of the manufacture of condensers. However no apparatus for the automatic fabrication of such condensers has heretofore been proposed.

The present invention has for its object to provide a machine for making electric condensers constituted of conductive and non conductive strips comprising at least two strip unwinding device, core gripping means for releasably gripping core members, means for rotating the core gripping means, at least one automatic core feeding device for introducing an insulated core into the core gripping means, means for ensuring the driving of the strips by the core, means for cutting and gluing the strips wound around the core and means for controlling the successive operations.

By the general expression "strips," it is understood to mean either a pair of metallized insulated strips or two pairs of sandwiched conductive and non conductive films.

The accompanying drawings represents by way of example one embodiment of a machine according to the invention.

Figure 1:
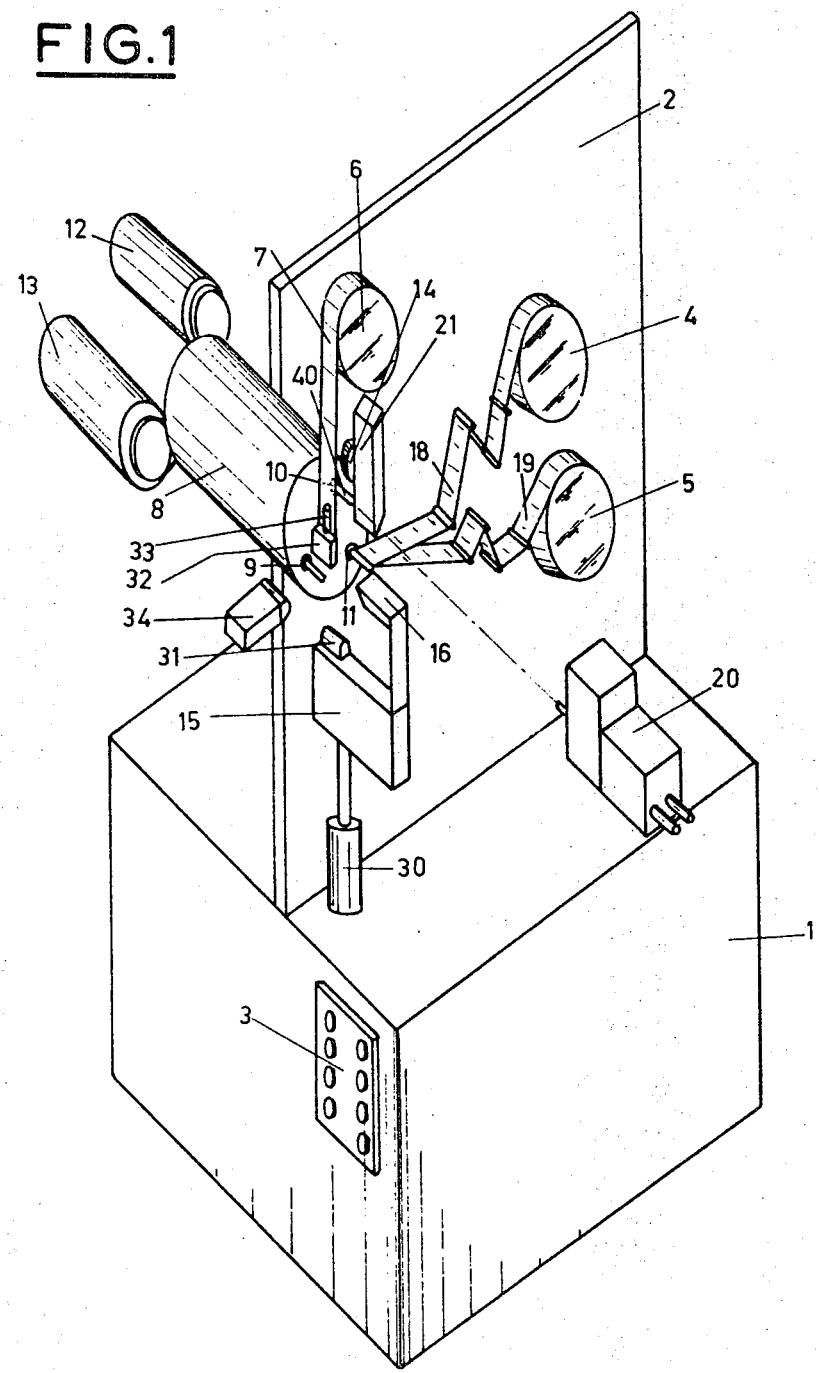
FIG. 1 shows a schematic view of a machine for winding condensers.

FIG. 1 shows an assembled schematic view of a winding machine. Only the elements essential to an understanding of the present invention have been shown in detail in order to simplify the figure. All the elements which are not described are of conventional construction.

On a frame 1 of the machine is mounted a vertical support 2 and a control panel 3. On the support 2 are mounted two strip unwinding devices 4 and 5 for unwinding insulated metallized strips used in making condensers as well as a third unwinding device 6 delivering a protective strip which is applied on the condenser at the end of winding operation. The machine additionally comprises a rotationally driven spindle-carrying shaft 8 carrying three grippers or pliers 9, 10 and 11 positioned on the circumference thereof and centered with respect to the axis of rotation of the spindle-carrying shaft. Each of the grippers is selectively rotated by an electrical motor. Two of which, 12 and 13, are visible in the drawing, through pulley shafts. These three motors are variable speed motors operative to obtain different rotational speeds according to the operations desired. A core feeding device 20, shown in detail in FIG. 2, automatically introduces cylindrical cores of insulated material contained in a loading device 21 of the feed device, into one of the pliers or grippers 9, 10 or 11, whichever is aligned facing the feed device. The pliers are conventional chucks and comprise a plurality of movable jaws which open and close to effect gripping of the core member.

The machine further includes a coil 14 having self-adherent tape on its two sides and positioned near the core feeding device 20 and a device 15 for dephasing the two fed strips by a prism and for cutting the two metallized bands 18, 19, at two places dephased one relative to the other, by two knives 16. The device 15 is mounted for vertical movement under the urging of a piston 30 followed by horizontal movement under the urging of a piston mounted inside the device, which comprises also a horizontal roller 31 cooperating with a block 32, fixed, for gripping the wound condenser when in the position occupied by the gripper 9. This block 32 has a roller similar to roller 31 and is actuated by a piston 33. On its hidden face, an opening is provided against which the protective band 7 is maintained by depression. The machine also comprises a gluing device 34 comprising a heating body for gluing the protective band 7 on itself by thermal-welding.

The frame 1 houses the electrical circuits and control members for the different elements of the machine and such components are of the conventional type.

The winding of a condenser takes place in the following manner:

Assuming that the spindle-carrying shaft 8 is in the position shown in the drawing, pliers 10 open and loading device 20 introduces a core 40 partially into the pliers 10 which releasably closes upon this core. A strip element with two self-adherent surfaces is then applied on the core, which slowly rotates device 14. The spindle-carrying shaft then turns by a third of a rotation to assume the position occupied by the gripper 11, in which the extremity of the two metallized strips 18 and 19 are applied with a predetermined dephasing on the self-adherent band. The metallized strips are driven by the rotational movement of the self-adherent band and core due to rotation of the gripper and the winding of the condenser is carried out. The spindle-carrying shaft 8 then turns another third of a rotation to bring the wound core in the position occupied by the gripper 9. In this position, after a certain number of rotations of the core, the dephasing and cutting device 15 comes into play. The prism 16 introduces itself between the two strips 18, 19 and effects a strip cutting operation by means of two knives placed on opposed edges. The two bands 18 and 19 are cut along two lines which are dephased angularly with respect to each other on the wound condenser in order to avoid a short circuit at the extremity of the two bands. Once the cutting is done, the device 32 applies the protective band on the wound condenser and the band is applied under pressure due to the squeezing together of roller 31 and of the opposite roller of the device 32. After several turns, this band is cut and glued by the device 34. The finished condenser is then automatically released from its pliers by means of a known device.

Figure 2:
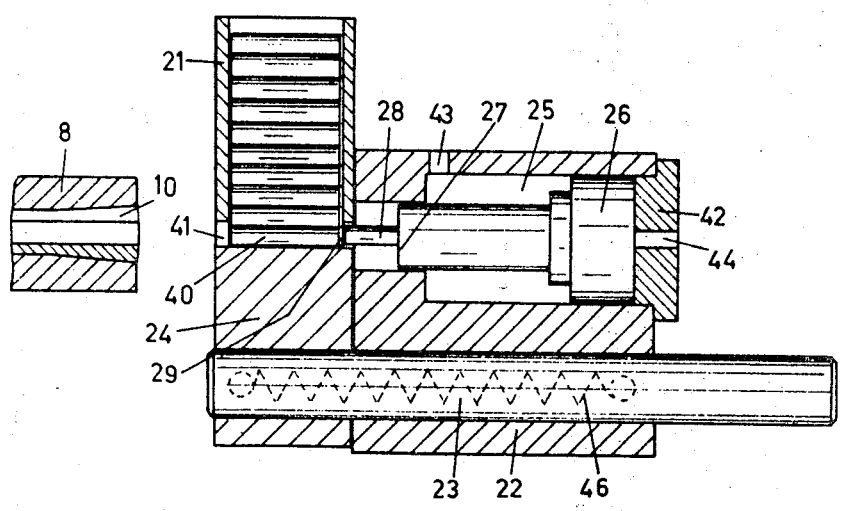
FIG. 2 shows a view in longitudinal cross section of a core feeding mechanism of the winding machine.
Figure 3:
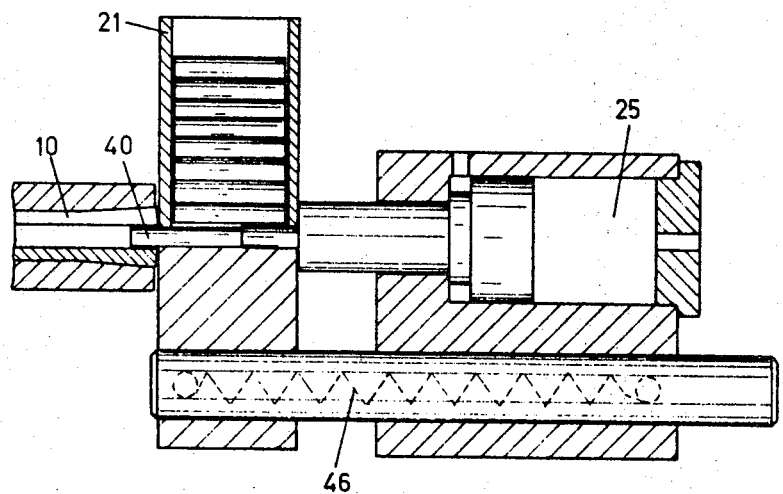
FIG. 3 shows a detailed view, similar to FIG. 2, of the core feeding mechanism in its working position.

FIGS. 2 and 3 show a modification of a core feeding device 20 in two extreme positions. This device comprises a body 22 in which slide two parallel guide rods 23 to which is secured a block 24 supporting a storage chamber or magazine 21 in which are stored insulated cores 40. In a cylindrical chamber 25 of the body 22 moves a hydraulic piston 26 driving a piston rod 27 having connected thereto a rod 28 of smaller diameter and dimensioned to penetrate through an opening 29 made in the base of the magazine 21. The opening 29 is aligned with the lower core 40 whose other extremity faces an opposite opening 41 of the magazine.

FIG. 2 shows the core feeding device in its nonworking position wherein the piston 26 is maintained against a closing nut 42 by the pressure of a fluid, for example of air, introduced through an orifice 43 in the cylinder 25. To effect an introduction of a core 40 in pliers 10, piston 26 is actuated by the introduction of pressurized fluid into an opening 44 provided in the nut 42. Rod 28 pushes a core 40, then the piston rod 27 abuts block 24 and magazine 21 and drives them toward the pliers. Once core 40 is introduced into the pliers 10, the latter closes around it. The fluid pressure in the cylinder 25 is then relieved and block 24 is brought back by a return spring 46 in order to allow the fall of the following core.

What is claimed is:

1. An apparatus for winding together two separate strips of material on a core member comprising: core gripping means for releasably gripping a core member; means for effecting rotation of said core gripping means; means for selectively positioning said core gripping means in a plurality of different working positions; core feeding means operative to automatically feed a core member to said core gripping means when said core gripping means is in a first working position whereby said core member is releasably gripped by said core gripping means; said core feeding means comprising means defining a storage chamber for storing a plurality of core members, and means for individually feeding core members from said storage chamber to said core gripping means; said last-mentioned means comprising a cylinder, and a fluid-actuated piston mounted for reciprocal movement in said cylinder and operative in response to fluid pressure applied to said cylinder to individually eject said core members from said storage chamber during reciprocal movement thereof; and means for feeding two separate strips of material to said core member when said core gripping means is in a second working position whereby rotational movement of said core gripping means effects winding of said two separate strips on said core member.

2. An apparatus according to claim 1; further including cutting means operative to cut said two separate strips of material when said core gripping means is in a third working position.

3. An apparatus according to claim 2; further including means operative when said core gripping means is in said third working position for applying a protective band around the strips of material wound on said core member.

References Cited

UNITED STATES PATENTS

| 3,010,668 | 11/1961 | McPherson et al. | 242—64 XR |
| 3,432,901 | 3/1969 | Fanning | 29—25.42 |
| 3,471,098 | 10/1969 | Jannett | 242—56.1 |
| 2,384,983 | 9/1945 | Weiss | 242—56.1 |
| 3,227,388 | 1/1966 | Masini | 242—56.1 |
| 3,251,115 | 5/1966 | Pfeiffer | 29—25.42 |

JOHN F. CAMPBELL, Primary Examiner

R. B. LAZARUS, Assistant Examiner

U.S. Cl. X.R.

242—56.1